March 31, 1925.
H. W. BUNDY
TUBE SOLDERING APPARATUS
Filed July 28, 1924
1,531,730
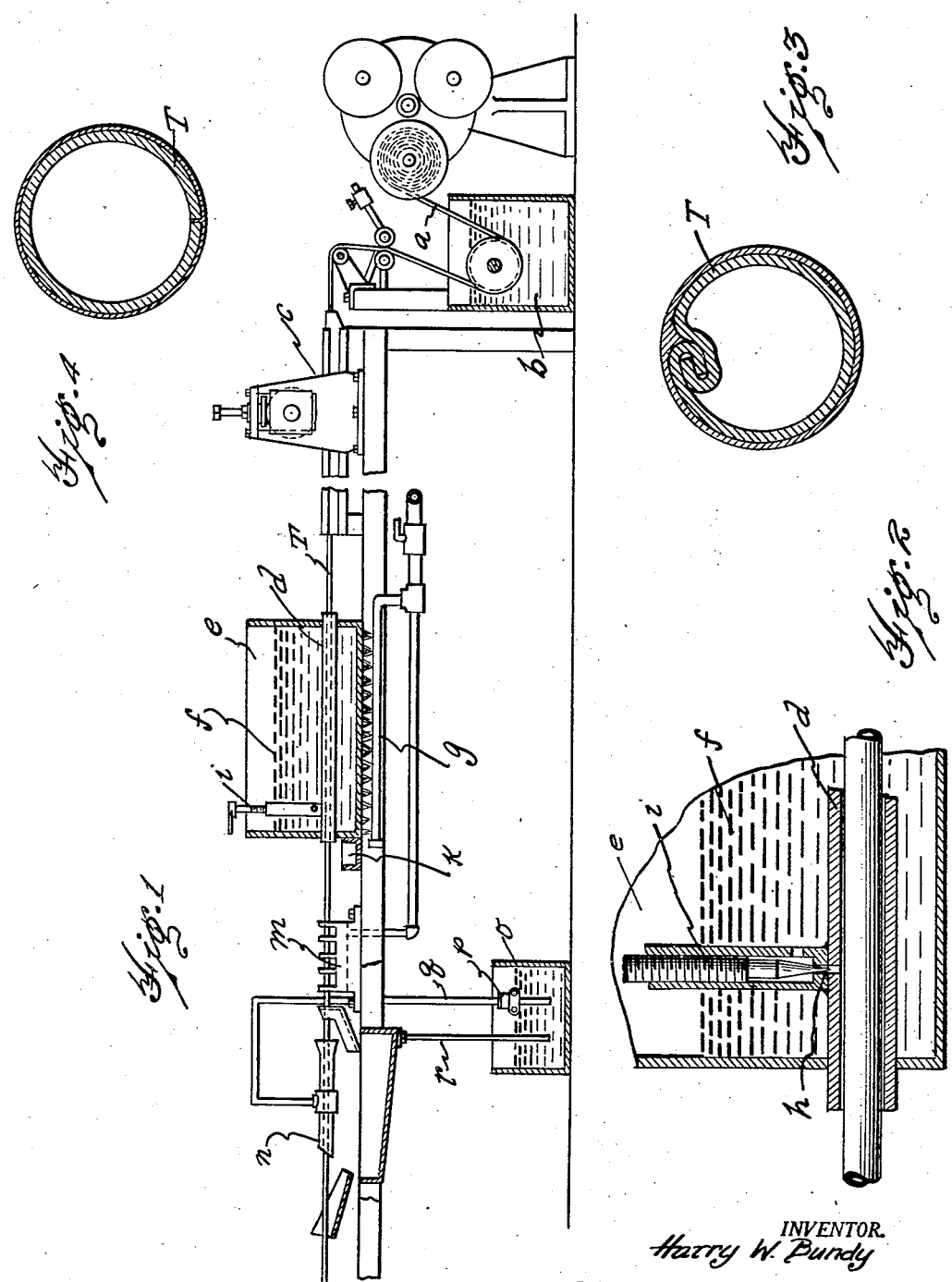
INVENTOR.
Harry W. Bundy
BY
Stuart C Barnes
ATTORNEY.

Patented Mar. 31, 1925.

1,531,730

UNITED STATES PATENT OFFICE.

HARRY W. BUNDY, OF DETROIT, MICHIGAN.

TUBE-SOLDERING APPARATUS.

Application filed July 28, 1924. Serial No. 728,578.

*To all whom it may concern:*

Be it known that I, HARRY W. BUNDY, a citizen of the United States, residing at Detroit, in the county of Wayne and State of Michigan, have invented certain new and useful Improvements in Tube-Soldering Apparatus, of which the following is a specification.

This invention relates to a machine for soldering tube and has for its object means whereby the tube may be passed through a regulatable bath of melted solder. With this apparatus it is possible to flow a measured stream of melted solder onto and around the tube so that there is a minimum of waste.

In the drawings:

Fig. 1 is a side elevation showing my complete tube machine diagrammatically, together with my improved mechanism for soldering the tube.

Fig. 2 is an enlarged sectional view through the soldering mechanism showing the regulatable means for controlling the stream of solder.

Fig. 3 is a cross section through a lock-seam tube coated with solder.

Fig. 4 is a cross section through a butt-seam tube coated with solder.

The machine is of standard construction and comprises suitable mechanism for taking a strip of stock $a$, passing the same through a fluxing bath $b$ and then through the forming rolls $c$ which form the strip stock into a tube T. It is immaterial as far as this application is concerned whether this tube be a lock-seam tube, a plural ply tube, or a butt-seam tube, as the construction of the tube has nothing to do with the subject matter of this invention.

The formed tube is then caused to pass through a conduit $d$ carried by the tank $e$. The tank $e$ is arranged to store a large quantity of melted solder $f$ which is kept in a molten condition by means of the burner $g$. At one end of the tubular conduit I provide an inlet opening $h$, and a needle valve $i$ controls the amount of solder that is allowed to pass through the opening.

The tube is continuously moving through the conduit $d$ and a stream of melted solder is continuously flowing through the inlet opening $h$ onto and around the tube. It will be seen from the drawings that the conduit has an inside diameter a little greater than the outside diameter of the tube, and the flow of solder into the conduit is regulated as nearly as possible so that all of the solder is used in covering the tube, and as little as possible is wasted. A drip pan $k$ is located adjacent the tank for catching any surplus solder that may flow out of the end of the conduit.

The soldered tube is now passed through the stripping and sizing dies $m$ and then through the water cooling apparatus $n$. This water cooling apparatus may be of any standard construction and I have here shown a water tank $o$, a suction pump $p$ for forcing the water through the conduit $q$ into the cooling apparatus $n$. The water then returns to the tank through the overflow pipe $r$.

What I claim is:

1. In an apparatus for soldering tube, the combination of means for longitudinally moving the tube, and means for flowing a stream of molten solder onto and around the tube while so traveling, and means for regulating said flow.

2. In an apparatus for soldering tube, the combination of a tank for storing melted solder, means for longitudinally moving the tube adjacent the tank, and means for flowing a stream of melted solder from said tank onto and around the tube while so traveling.

3. In an apparatus for soldering tube, the combination of a tank for storing melted solder, means for longitudinally moving the tube adjacent the tank, and regulatable means for flowing a stream of melted solder from the tank onto and around the tube while so traveling.

4. In an apparatus for soldering tube, the combination of means for longitudinally moving the tube, a tank for storing melted solder, and a conduit through which the tube moves provided with an inlet opening in communication with the tank to allow a stream of solder to flow from the tank into the conduit and around the tube to coat the same with solder while the tube is moving through said conduit.

5. In an apparatus for soldering tube, the combination of means for longitudinally moving the tube, a tank for storing melted solder, a conduit through which the tube moves provided with an intake opening in communication with the tank to allow a stream of melted solder to flow onto and around the tube while the same is moving through said conduit, and means for regulating said flow.

6. In an apparatus for soldering tube, the combination of means for longitudinally moving the tube, a tank for storing melted solder, a conduit passing through the mass of melted solder and provided with an inlet opening to allow a stream of melted solder to flow onto and around the tube, and means for regulating said stream of melted solder.

In testimony whereof I have affixed my signature.

HARRY W. BUNDY.